US010628872B2

(12) United States Patent
Sakazume

(10) Patent No.: US 10,628,872 B2
(45) Date of Patent: Apr. 21, 2020

(54) BROWSING DEVICE, INFORMATION PROCESSING SYSTEM, METHOD OF CONTROLLING BROWSING DEVICE, RECORDING MEDIUM, AND PROGRAM

(71) Applicant: RAKUTEN, INC., Tokyo (JP)

(72) Inventor: Tomoaki Sakazume, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 416 days.

(21) Appl. No.: 14/379,958

(22) PCT Filed: Mar. 29, 2013

(86) PCT No.: PCT/JP2013/059538
§ 371 (c)(1),
(2) Date: Aug. 20, 2014

(87) PCT Pub. No.: WO2014/155672
PCT Pub. Date: Oct. 2, 2014

(65) Prior Publication Data
US 2016/0078522 A1 Mar. 17, 2016

(51) Int. Cl.
*G06Q 30/02* (2012.01)
*G06Q 30/06* (2012.01)
(Continued)

(52) U.S. Cl.
CPC ....... *G06Q 30/0633* (2013.01); *G06F 3/0482* (2013.01); *G06F 3/04812* (2013.01);
(Continued)

(58) Field of Classification Search
CPC ........................................ G06Q 30/0207–0277
(Continued)

(56) References Cited

U.S. PATENT DOCUMENTS 7,975,020 B1 * 7/2011 Green ................ G06Q 30/0241
705/14.4
2007/0282802 A1 * 12/2007 Wilhelm ........... G06F 17/30884
(Continued)

FOREIGN PATENT DOCUMENTS

| CN | 102999250 A | 3/2013 |
| JP | 2007-249494 A | 9/2007 |
| TW | 200925973 A | 6/2009 |

OTHER PUBLICATIONS

International Search Report, PCT/JP2013/059538 dated Jun. 11, 2013 [PCT/ISA/210].
(Continued)

*Primary Examiner* — Sam Refai
(74) *Attorney, Agent, or Firm* — Sughrue Mion, PLLC

(57) ABSTRACT

In an information processing system (1), a browsing device (30A, 30B) acquires open information the user wishes to browse, and notice information accompanying the open information and notified to the user from a shopping mall server (10). The browsing device (30A, 30B) displays on a screen the open information and a cursor of which the position changes based on instruction from the user. The browsing device (30A, 30B) displays the notice information in front of the open information when a predetermined start condition is satisfied. The browsing device (30A, 30B) continues to display the notice information while the cursor is positioned within a notice region where the notice information is displayed. The browsing device (30A, 30B) ends the display of the notice information when the cursor does not move into the notice region within a predetermined holding time since the user gives the first instruction to move the position of the cursor after the display of the notice information started.

7 Claims, 9 Drawing Sheets

(51) Int. Cl.
    *G06F 3/0481*     (2013.01)
    *G06F 3/0482*     (2013.01)
(52) U.S. Cl.
    CPC ..... *G06Q 30/0253* (2013.01); *G06Q 30/0277*
        (2013.01); *G06Q 30/06* (2013.01); *G06Q*
        *30/0641* (2013.01)
(58) Field of Classification Search
    USPC .............................................. 705/14.1–14.73
    See application file for complete search history.

(56) References Cited

U.S. PATENT DOCUMENTS

2009/0132919 A1     5/2009  Allen et al.
2009/0281889 A1*   11/2009  Derosa-Grund ....... G06Q 30/00
                                                   705/14.25

OTHER PUBLICATIONS

Written Opinion for PCT/JP2013/059538 dated Jun. 11, 2013 [PCT/ISA/237].

* cited by examiner

251

| PRODUCT CODE | PRODUCT NAME | QUANTITY IN STOCK | UNIT PRICE | ... |
|---|---|---|---|---|
| 12345 | 6-PACK 2-LITER MINERAL WATER | 300 | ¥600 | ... |
| 17890 | APPLE JUICE | 1000 | ¥200 | ... |
| 20001 | ASSORTED FRUITS FROM ○○ PREFECTURE | 50 | ¥2000 | ... |
| 59876 | ONE NIGHT STAY AT HOTEL XX INCLUDING TWO MEALS | 5 | ¥8000 | ... |
| ... | ... | ... | ... | ... |

| USER ID | DATE | PRODUCT CODE | QUANTITY | ... |
|---|---|---|---|---|
| abcde@xxx.yyy.jp | MARCH 30, 2013 12:30:45 | 12345 | 1 | ... |
| abcde@xxx.yyy.jp | MARCH 30, 2013 12:41:27 | 20001 | 1 | ... |
| zyx@aaa.bbb | MARCH 30, 2013 23:55:10 | 59876 | 1 | ... |
| ... | ... | ... | ... | ... |

FIG.4

BROWSING DEVICE, INFORMATION PROCESSING SYSTEM, METHOD OF CONTROLLING BROWSING DEVICE, RECORDING MEDIUM, AND PROGRAM

CROSS REFERENCE TO RELATED APPLICATIONS

This application is a National Stage of International Application No. PCT/JP2013/059538 filed Mar. 29, 2013, the contents of all of which are incorporated herein by reference in their entirety.

TECHNICAL FIELD

The present invention relates to a browsing device, information processing system, method of controlling browsing device, recording medium, and program for properly giving notice accompanying information the user requests to browse, thereby, for example, motivating and encouraging the user to purchase a product.

BACKGROUND ART

Virtual shopping malls operated on the Internet have become prevalent. The users can access shopping mall sites using a personal computer or cell-phone and browse various products and services exhibited within the shopping malls. Then, if there is a product or service the user likes, the user can add the product or service to his purchase list generally called a cart or shopping basket and then purchase it.

Online shopping malls have been modified in many ways in order to attract more customers and increase the sales at virtual stores. For example, Patent Literature 1 describes an online shopping mall of which the virtual stores provide the links to each other so as to mutually increase users.

Furthermore, generally, not only open information the user wishes to view but also notice information the store operator wants the user to view are shown so that information is conveyed to the user properly.

CITATION LIST

Patent Literature

Patent Literature 1: Unexamined Japanese Patent Application Kokai Publication No. 2007-249494.

SUMMARY OF INVENTION

Technical Problem

At a real-life shopping mall, the users sometimes have difficulty in finding a desired product. However, the users can easily search for and find a product at a virtual online shopping mall. On the other hand, at a virtual online shopping mall, the user can easily add a product to his cart and leave the product in his cart, ending up not purchasing. Thus, although the exhibitor can let many users know about his products, a problem is that it is not unusual that the product is left in the cart and the exhibitor misses a chance to sell the product.

The present disclosure is invented with the view of the above situation and an exemplary objective of the present disclosure is to provide a browsing device, information processing system, browsing device control method, recording medium, and program for properly giving notice accompanying information the user requests to browse, thereby, for example, motivating and encouraging the user to purchase a product.

Solution to Problem

The browsing device according to a first exemplary aspect of the present disclosure comprises:
an acquirer acquiring open information the user wishes to browse, and notice information accompanying the open information and notified to the user; and a display displaying on a screen the open information and a cursor of which the position changes based on instruction from the user, and
(a) starting to display the notice information in front of the open information when a predetermined start condition is satisfied;
(b) continuing to display the notice information in the front while the cursor is positioned within a notice region where the notice information is displayed on the screen; and
(c) ending the display of the notice information in the front when a predetermined end condition is satisfied after the display of the notice information started,
wherein the end condition is satisfied when the cursor does not move into the notice region within a predetermined holding time since the user gives the first instruction to move the position of the cursor after the display of the notice information in the front started.

Furthermore, in the above viewing device according to the aspect,
the start condition is satisfied when the user wishes to browse the open information while the open information is not displayed on the screen and the open information is displayed on the screen.

Furthermore, in the above viewing device according to the aspect,
the start condition is satisfied when the cursor moves into a predetermined start region in the open information displayed on the screen, and
the end condition is satisfied when the cursor moves to the outside of both the start region and notice region after the cursor moved into the start region and the display of the notice information in the front started.

Furthermore, in the above viewing device according to the aspect,
the open information contains advertisement images, and
the display enlarges the notice region when the notice region overlaps with the display positions of the advertisement images in the open information, sets the region of the enlarged notice information that overlaps with the advertisement images transparent or translucent, and displays the notice information in a region that does not overlap with the advertisement images.

Furthermore, in the above viewing device according to the aspect,
the open information contains advertisement images, and
the display moves the notice region to a position where the notice region does not overlap with the advertisement images when the notice region overlaps with the display positions of the advertisement images in the open information.

Furthermore, the above viewing device according to the aspect comprises:
an input receiver receiving from the user an instruction to purchase a product sold by a server connected via a communication network,
wherein the notice information contains a list of products the user intended to purchase, and the display displays the list in front of the open information since the start condition is satisfied and until the end condition is satisfied.

Furthermore, in the above viewing device according to the aspect, a button receiving from the user a request to make a payment for a product contained in the list is provided in the notice region, the input receiver further receives the request made by pressing the button, and a payment instructor instructing the server to process the payment for the product when the button is pressed is further provided.

The information processing system according to a second exemplary aspect of the present disclosure is an information processing system comprising a browsing device used by a user and a server connected to the browsing device via a communication network, wherein the server comprises:

a storage storing open information and notice information accompanying the open information and notified to the user; and a transmitter transmitting the open information the user wishes to browse and the notice information to the browsing device, the browsing device comprises:

an acquirer acquiring the open information and notice information from the server; and a display displaying on a screen the open information and a cursor of which the position changes based on instruction from the user, and (a) starting to display the notice information in front of the open information when a predetermined start condition is satisfied;

(b) continuing to display the notice information in the front while the cursor is positioned within a notice region where the notice information is displayed on the screen; and (c) ending the display of the notice information in the front when a predetermined end condition is satisfied after the display of the notice information started, and the end condition is satisfied when the cursor does not move into the notice region within a predetermined holding time since the user gives the first instruction to move the position of the cursor after the display of the notice information in the front started.

The browsing device control method according to a third exemplary aspect of the present disclosure comprises:

an acquisition step of acquiring open information a user wishes to browse, and notice information accompanying the open information and notified to the user; and a display step of displaying on a screen the open information and a cursor of which the position changes based on instruction from the user, and (a) starting to display the notice information in front of the open information when a predetermined start condition is satisfied;

(b) continuing to display the notice information in the front while the cursor is positioned within a notice region where the notice information is displayed on the screen; and (c) ending the display of the notice information in the front when a predetermined end condition is satisfied after the display of the notice information started, wherein the end condition is satisfied when the cursor does not move into the notice region within a predetermined holding time since the user gives the first instruction to move the position of the cursor after the display of the notice information in the front started.

The computer-readable recording medium according to a fourth exemplary aspect of the present disclosure stores a program allowing a computer to function as:

an acquirer acquiring open information a user wishes to browse, and notice information accompanying the open information and notified to the user; and a display displaying on a screen the open information and a cursor of which the position changes based on instruction from the user, and (a) starting to display the notice information in front of the open information when a predetermined start condition is satisfied;

(b) continuing to display the notice information in the front while the cursor is positioned within a notice region where the notice information is displayed on the screen; and (c) ending the display of the notice information in the front when a predetermined end condition is satisfied after the display of the notice information started, wherein the end condition is satisfied when the cursor does not move into the notice region within a given holding time since the user gives the first instruction to move the position of the cursor after the display of the notice information in the front started.

The program according to a fifth exemplary aspect of the present disclosure allows a computer to function as:

an acquirer acquiring open information a user wishes to browse, and notice information accompanying the open information and notified to the user; and a display displaying on a screen the open information and a cursor of which the position changes based on instruction from the user, and (a) starting to display the notice information in front of the open information when a predetermined start condition is satisfied;

(b) continuing to display the notice information in the front while the cursor is positioned within a notice region where the notice information is displayed on the screen; and (c) ending the display of the notice information in the front when a predetermined end condition is satisfied after the display of the notice information started, wherein the end condition is satisfied when the cursor does not move into the notice region within a predetermined holding time since the user gives the first instruction to move the position of the cursor after the display of the notice information in the front started.

The above program can be distributed/sold via a computer communication network independently from a computer on which the program runs. Furthermore, the above recording medium can be a non-transitory recording medium and distributed/sold independently from the computer.

Advantageous Effects of Invention

The present disclosure can properly give notice accompanying information the user requests to browse, thereby, for example, motivating and encouraging the user to purchase a product.

BRIEF DESCRIPTION OF DRAWINGS

FIG. 3 is an illustration showing an exemplary structure of the product database;

FIG. 4 is an illustration showing an exemplary structure of the purchase list database;

DESCRIPTION OF EMBODIMENTS

Embodiments of the present disclosure will be described. The following embodiments are given for the purpose of explanation and do not confine the disclosure of the present application. A person of ordinary skill in the field may embrace an embodiment in which some or all components are replaced with equivalent counterparts and such an embodiment falls under the scope of the present disclosure.

(Embodiment 1)

Figure 1:
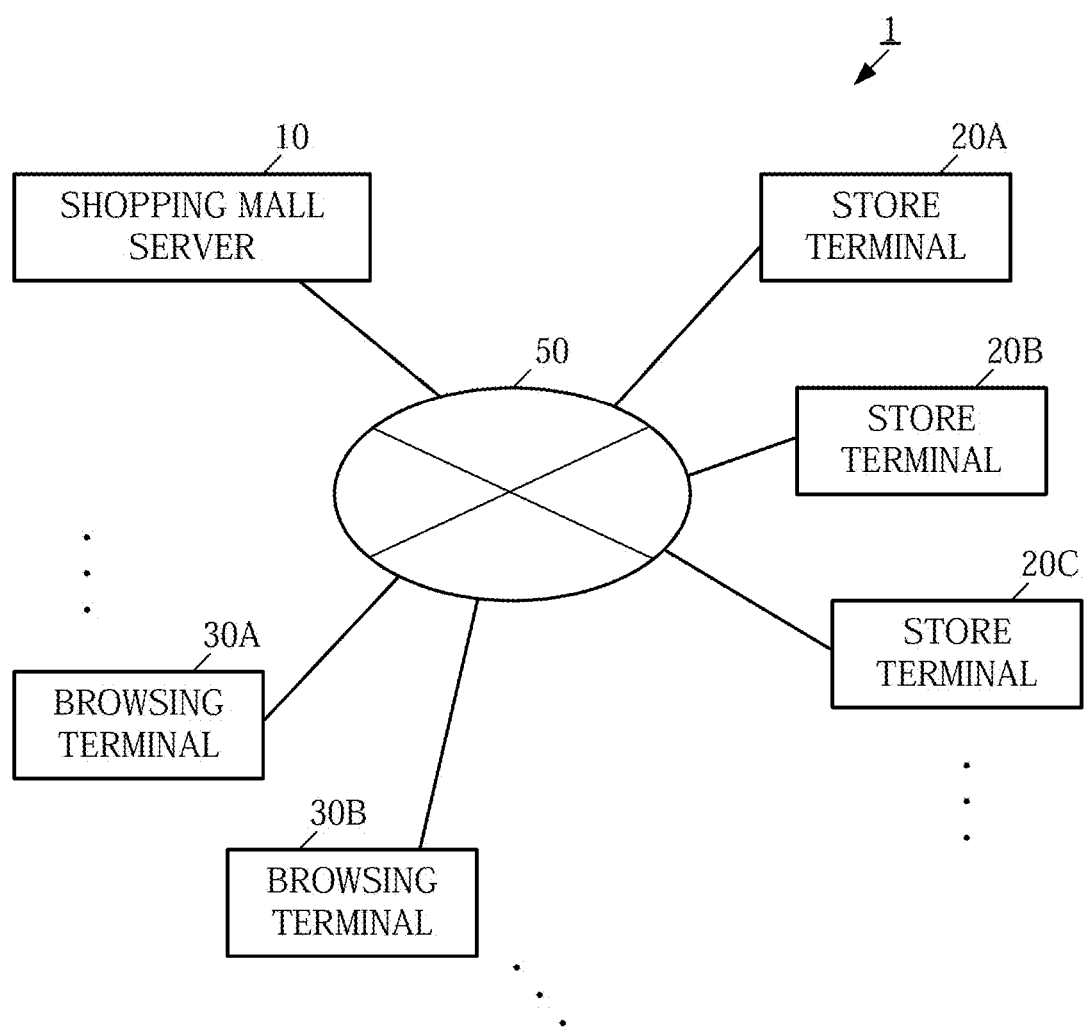
FIG. 1 is an illustration showing the general configuration of the information processing system according to Embodiment 1 of the present disclosure.

First, the general configuration of an information processing system 1 of this embodiment will be described using FIG. 1. The information processing system 1 comprises a shopping mall server 10, store terminals 20 installed in one or more stores exhibiting at the shopping mall (three store terminals 20A, 20B, and 20C in FIG. 1), browsing terminals 30 used by one or more users who shop at the shopping mall (two browsing terminals 30A and 30B in FIG. 1), and a communication network 50. In this embodiment, the communication network 50 is the Internet.

The shopping mall server 10 is a server managing a virtual shopping mall on the Internet where multiple stores participate. The shopping mall server 10 is managed by the manager of the shopping mall. Any number of stores can participate in the shopping mall and various products and services are sold at the shopping mall.

In the following explanation, for simplified explanation, the products and services are collectively termed "products" and include intangible services such as hotel reservations, online tickets, and licenses to use software applications.

The store terminals 20 are installed in the stores selling products at the shopping mall. The sales persons of the stores operate the store terminals 20 to register data presenting the products they sell ("the product data," hereafter) at the shopping mall server 10.

More specifically, the product data include, for example, a product code identifying the product, product name, product quantity in stock, product unit selling price, product size, product weight, product shipping fee, product image, and service provision date.

The browsing terminals 30 are operated by the users who browse and purchase products exhibited at the shopping mall. The browsing terminals 30 are typically a personal computer, portable terminal, cell-phone, smart phone, tablet terminal, or the like. The users can purchase products at the shopping mall by operating their browsing terminals 30.

The communication network 50 connects the shopping mall server 10, store terminals 20, and browsing terminals 30 to each other. The communication network 50 is typically the Internet but can include telephone lines, dedicated lines, LANs (Local Area Networks), and the like.

The shopping mall server 10 stores open information presenting the products sold at the shopping mall to the users in advance and sends the open information to the browsing terminal 30 that made an access request. The open information is provided on web pages accessible by the browsing terminals 30. The web pages comprise HTML (Hypertext Markup Language) data, image data, sound data, and the like. The web pages do not need to be in the HTML format and can be in the XML (Extensible Markup Language), XHTML (Extensible Hypertext Markup Language), or other format.

The contents of the open information include, for example, introduction to the products sold at the shopping mall, introduction to campaign conducted at the shopping mall, and news articles. The open information is provided to all browsing terminals 30 regardless of the users.

A shopping mall web page managed by the shopping mall server 10 displays a list of products sold at the stores ("the sales list," hereafter). Upon request from the browsing terminals 30, the shopping mall server 10 sends to the browsing terminals 30 web page data constituting the open information. The browsing terminals 30 display the web page on their display. The structure of the web page will be described later in detail.

Furthermore, upon access request from the browsing terminals 30, the shopping mall server 10 sends to the browsing terminals 30 notice information that should be notified to the user who is using the browsing terminal 30.

The contents of the notice information include, for example, data presenting the products the user intends to purchase and has added to his purchase list, purchase history of the user, shopping points the user possesses, user announcements, or email messages to the user. The purchase list is generally called "a cart" or "shopping basket."

Receiving an access request from a browsing terminal 30, the shopping mall server sends the open information to the browsing terminal 30 and if there is any notice information associated with the user of the browsing terminal 30, sends the notice information to the browsing terminal 30. The browsing terminal 30 displays the open information and if there is any notice information, displays the notice information.

Figure 2:
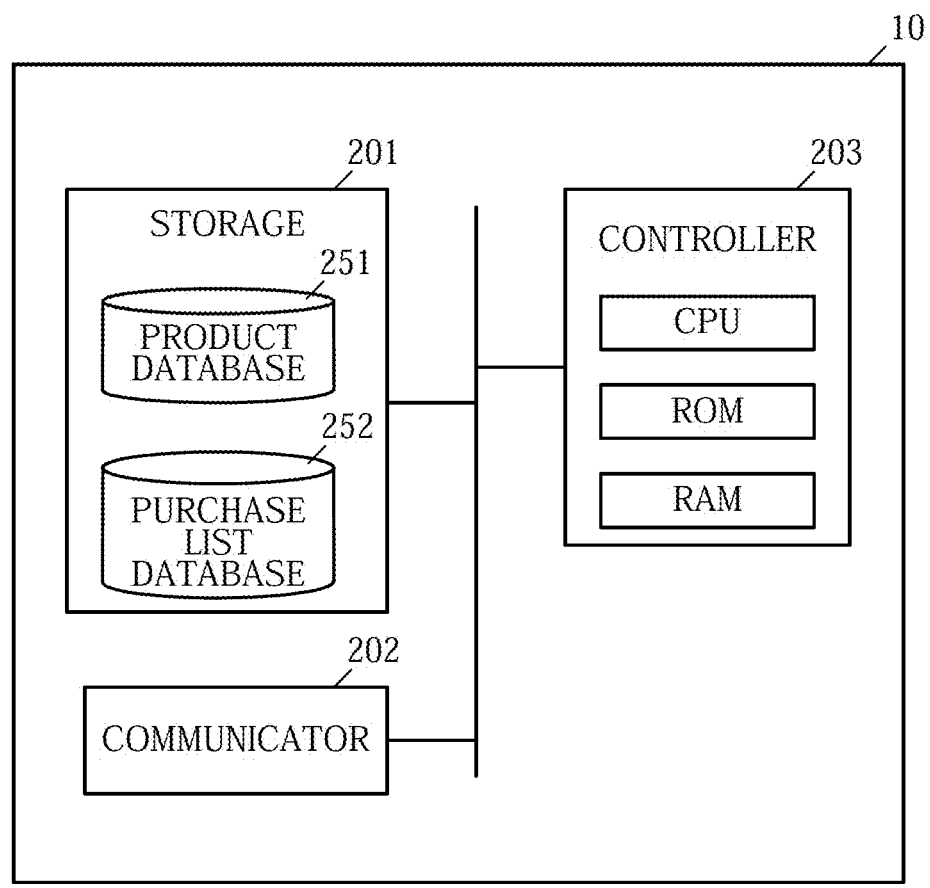
FIG. 2 is an illustration showing the configuration of the shopping mall server.

The hardware configuration of the shopping mall server 10 will be described hereafter using FIG. 2. The shopping mall server 10 comprises a storage 201, a communicator 202, and a controller 203.

The storage 201 comprises a storage device such as a hard disk. The storage 201 stores a product database 251. The product database 251 retains product data for all products exhibited at the shopping mall. The product data are registered by the persons in charge of the stores in advance.

FIG. 3 shows an exemplary structure of the product database 201. The product database 201 retains data presenting the attributes of products such as the product name, quantity in stock, unit price in association with a product code identifying the product. The product database 201 is updated as needed by the store terminals 20 operated by the persons in charge of the stores selling the products or by the shopping mall server 10.

Furthermore, the storage 201 stores a purchase list database 252. The purchase list database 252 stores data presenting the products each user intends to purchase and has added to his purchase list (in a shopping basket) in association with the user. The purchase list database 252 is updated as needed by the shopping mall server 10 based on the purchase list sent from the browsing terminal 30.

FIG. 4 shows an exemplary structure of the purchase list database 252. The purchase list database 252 retains data presenting the date/time of registration on the purchase list (the date/time when the product is added to the shopping basket), product code, and quantity in association with a user ID identifying the user. In this embodiment, the user ID is an email address owned by the user and registered at the shopping mall server 10 in advance. Instead of an email address, a unique string of characters or numbers or the like assigned to each user can be used.

The communicator 202 comprises a NIC (Network Interface Card). The communicator 202 connects the shopping mall server 10 to the communication network 50 and communicates with the store terminals 20 and browsing terminals 30.

The controller 203 comprises a CPU (Central Processing Unit), a ROM (Read Only Memory), a RAM (Random Access Memory), and the like and controls the entire shopping mall server 10.

The shopping mall server 10 can be a conventional computer server, main frame, or cloud server.

Figure 5:
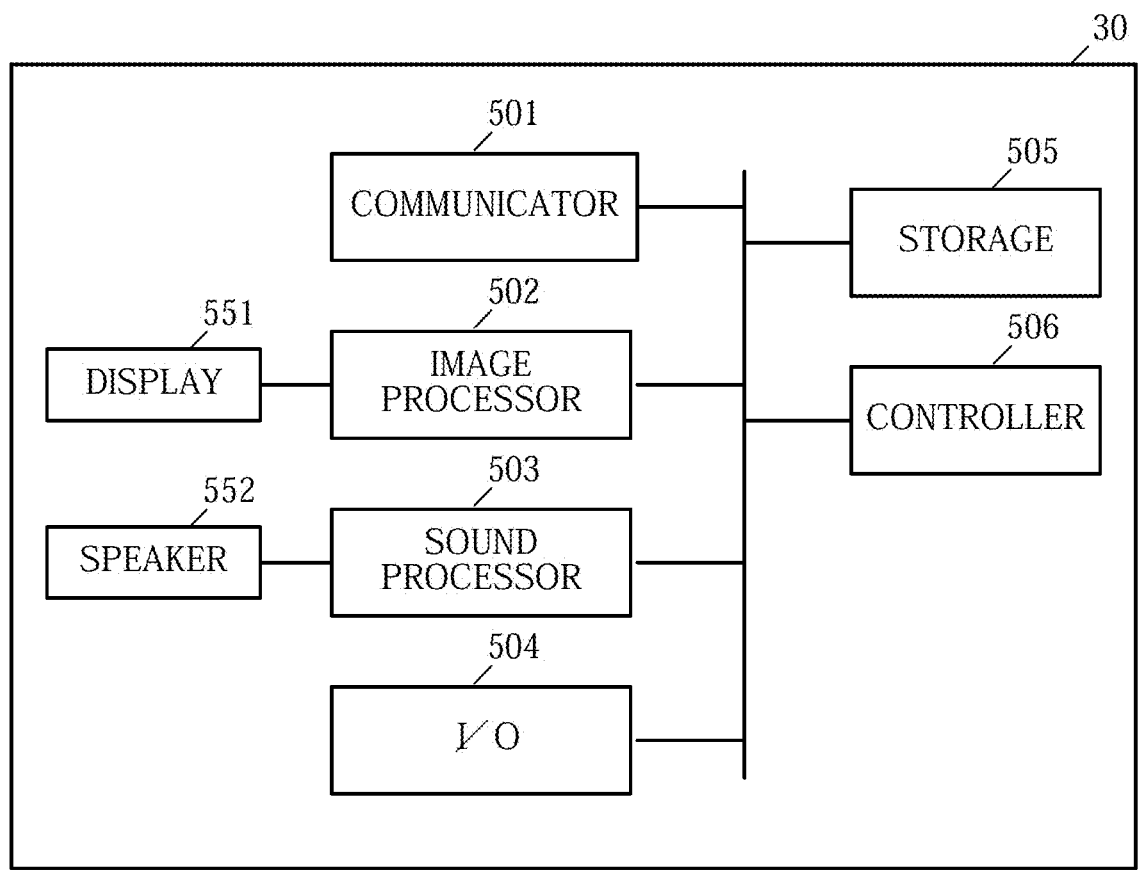
FIG. 5 is an illustration showing the configuration of the browsing device.

The hardware configuration of the browsing terminals 30 will be described hereafter using FIG. 5. A browsing terminal 30 comprises a communicator 501, an image processor 502, a sound processor 503, An I/O (Input/Output) unit 504, a storage 505, and a controller 506.

The communicator 501 comprises a NIC. The communicator 501 connects the browsing terminal 30 to the communication network 50 and communicates with the shopping mall server 10 and browsing terminals 30.

The image processor 502 creates a screen to display on a display 551 and displays the screen on the display 551. For example, the image processor 501 receives product data, HTML data and image data constituting a web page for introducing the products exhibited at the shopping mall, and HTML data and image data constituting a web page for receiving purchase of a product from the shopping mall server 10 via the communicator 501, and displays the screen introducing the products and the screen receiving purchase of the product on the display 551.

The sound processor 503 acquires sound data from the storage 505 or shopping mall server 10, reproduces the sound data, and outputs the sound from a speaker 552.

The I/O 504 comprises an interface such as a USB (Universal Serial Bus) and connects a memory card, external hard disk, or the like to the browsing terminal 30.

The storage 505 comprises a storage device such as a hard disk and stores an operating system controlling the browsing terminal 30, various programs, image data, sound data, text data, and the like.

The controller 506 comprises a CPU and controls the entire browsing terminal 30.

As a browsing terminal 30, a conventional personal computer with the communication capability, portable terminal, cell-phone, smart phone, tablet terminal, or the like can be used.

Figure 6:
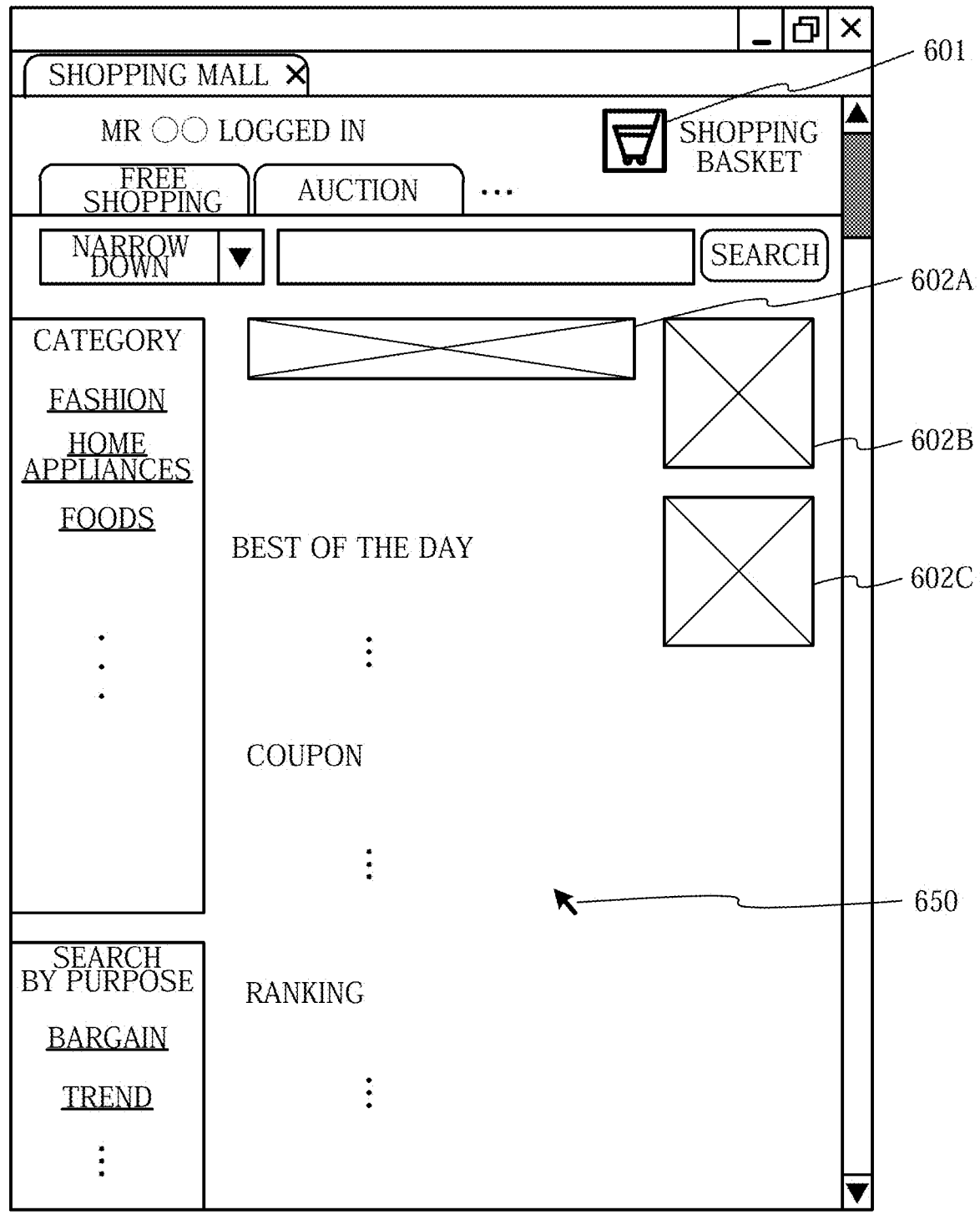
FIG. 6 is an illustration showing an exemplary structure of a web page provided by the shopping mall server.

FIG. 6 shows an exemplary structure of a web page of the shopping mall. On this web page, a product introduction, a search bar, a pull-down menu button for displaying the products classified by any category, a cart icon 601 that is a button for displaying the purchase list, and advertisement (ad) images 602 (three images 602A, 602B, and 602C in FIG. 6) are displayed. Furthermore, a cursor 650 with which the user specifies a position is displayed on the display 551.

In this embodiment, the top page that is displayed when the shopping mall server 10 is first accessed and a product introduction page that is displayed when the product is selected correspond to the above-described open information. On the other hand, the purchase list of the accessing user that is displayed when the cart icon 601 is pressed corresponds to the notice information.

For example, as the user clicks on a button to select a product, the browsing terminal 30 adds to the purchase list the product's identification information (product code) and quantity to purchase and stores the purchase list in the storage 505. The browsing terminal 30 sends the user ID identifying the user and the purchase list to the shopping mall server 10. The shopping mall server 10 stores the purchase list in the purchase list database 252 in association with the user ID.

As the user moves the cursor 650 onto the cart icon 601, the controller 506 of the browsing terminal 30 displays the contents of the purchase list of the user.

Figure 7:
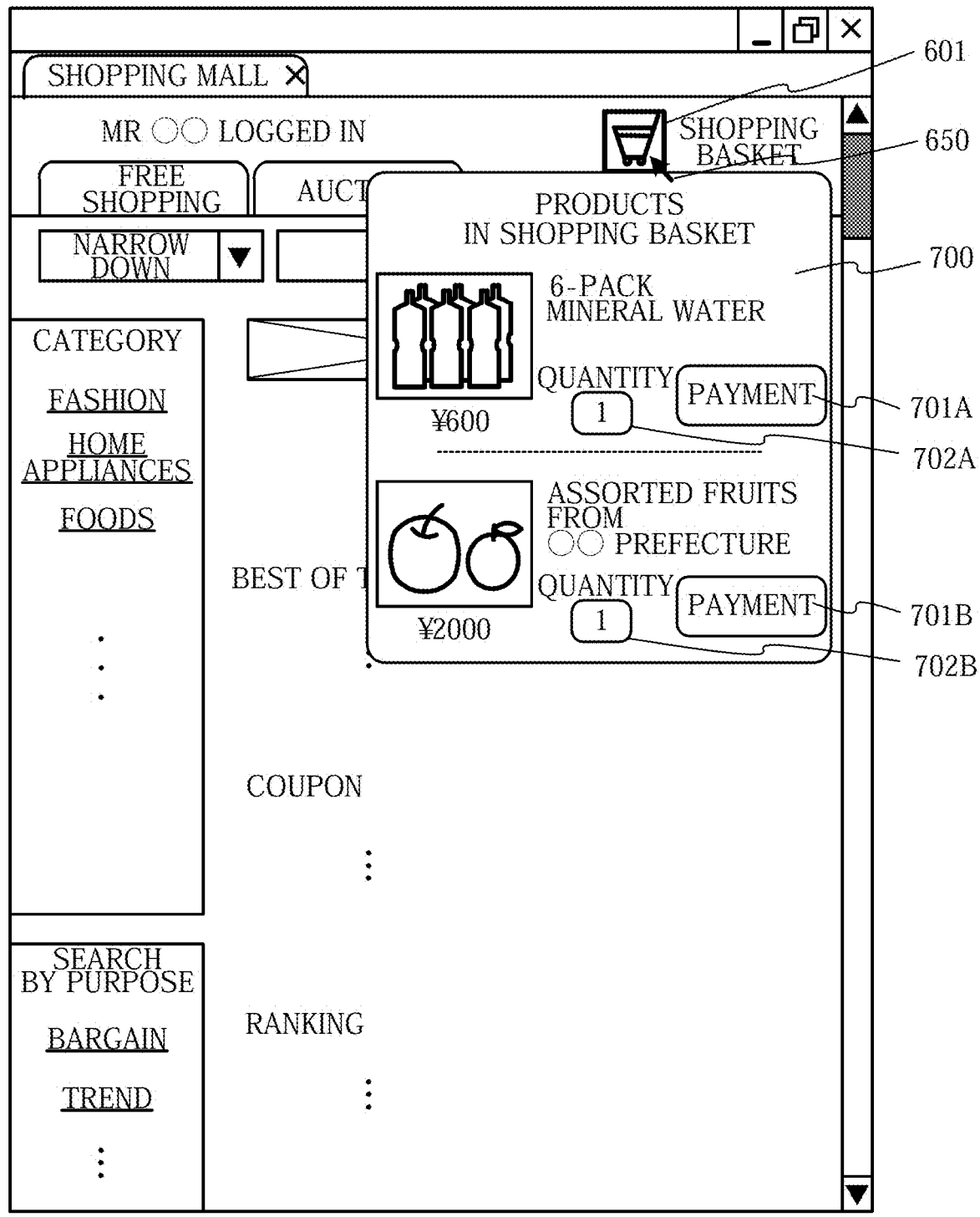
FIG. 7 is an illustration showing an exemplary structure of a pop-up image presenting a purchase list.

FIG. 7 shows an exemplary display of the purchase list. After determining that a predetermined start condition is satisfied, the controller 506 starts displaying a pop-up image 700. There are two given start conditions.

More specifically, one of the predetermined start conditions is that "the cursor 650 enters a predetermined start region." The predetermined start region is the display region of the cart icon 601. If the cursor 650 enters the display region of the cart icon 601, the controller 506 displays the pop-up image 700 presenting the contents of the purchase list of the user on the web page introducing the products in a superimposed manner.

It is desirable that the pop-up image 700 is displayed near the cart icon 601 and near the cursor 650. The display region of the pop-up image 700 is also termed a notice region.

The pop-up image 700 contains images presenting the products contained in the purchase list, product names, and product codes, and additionally contains payment buttons 701 for shifting to a screen to make a payment for a product contained in the purchase list (two buttons 701A and 701B in FIG. 7) and change buttons 702 for changing a product quantity to purchase (two buttons 702A and 702B in FIG. 7). The user can check or change the contents of his purchase list by simply placing the cursor 650 at the position of the cart icon 601. Furthermore, the user can proceed to a screen to make a payment for a product contained in his purchase list.

When multiple products are contained in the purchase list, the controller 506 displays a payment button 701 and a change button 702 for each product contained in the purchase list.

When multiple products are registered on the purchase list, the controller 506 can display a payment button 701 for each product or display an all-at-once payment button (not shown) for making a payment for all products registered on the purchase list. If the all-at-once payment button is pressed by the user, the controller 506 proceeds to a screen to make a payment for all products contained in the purchase list.

Furthermore, the controller 506 can display a payment button 701 for each store when multiple products are registered on the purchase list and the products are sold at different stores. When a payment button 701 associated with a store is pressed by the user, the controller 506 proceeds to a screen to make a payment for the products sold at the store corresponding to the pressed payment button 701 among all products contained in the purchase list.

The pop-up image 700 can contain, in addition to the payment buttons 701A and 701B and change buttons 702A and 702B, a button to delete a product from the purchase list, and a button to shift to the top page of the store that sells the product. The pop-up image 700 can be of any size, shape, and design.

The pop-up image 700 may be deleted by the controller 506. In other words, after determining that a predetermined end condition is satisfied, the controller 506 ends the display of the pop-up image 700 and deletes the pop-up image 700.

More specifically, the predetermined end condition is that "the cursor 650 does not move onto the pop-up image 700 within a predetermined holding time since the first instruction to move the position of the cursor 650 is given after the display of the pop-up image 700 has started." The controller 506 removes the pop-up image 700 when the cursor 650 is not moved onto the pop-up image 700 within a predetermined holding time even if the user has moved the cursor 650 after the pop-up image 700 is displayed.

The holding time starts when the first instruction to move the cursor 650 is given after the display of the pop-up image 700 started.

The holding time ends when a predetermined time has elapsed since the start time of the holding time. The predetermined time is determined in advance and, for example, five seconds, 10 seconds, or the like.

For example, if the user does not move the cursor 650 at all after the display of the pop-up image 700 started, the controller 506 continues to display the pop-up image 700.

If the user starts moving the cursor 650 after the display of the pop-up image 700 started, the controller 506 starts measuring the holding time at the time when the user starts moving the cursor 650.

If the user moves the cursor 650 into the display region of the pop-up image 700 after the measuring of the holding time started, the controller 506 continues to display the pop-up image 700.

If the user has moved the cursor 650 but never into the display region of the pop-up image 700 within the holding time after the measuring of the holding time started, the controller 506 deletes the pop-up image 700.

As described above, the determination to end the display of the pop-up image 700 or not is triggered by the user instruction to move the cursor 650 after the pop-up image 700 is displayed.

For example, as the user moves the cursor 650 onto the cart icon 601 while the web page shown in FIG. 6 is displayed, the pop-up image 700 shown in FIG. 7 is displayed. However, if the user does not move the cursor 650 onto the pop-up image 700 within a predetermined holding time since the user first started moving the cursor 650 after the pop-up image 700 is displayed, the pop-up image 700 automatically disappears and the web page shown in FIG. 6 comes back.

The payment buttons 701 and change buttons 702 are both software buttons. The event of the user conducting a predetermined operation (typically clicking the mouse) while the cursor 650 is within the image regions where these software buttons are displayed is expressed by the phrase "the user presses the button."

By the way, after adding a product to the purchase list, the user sometimes ends the display of the web page tentatively or closes the application displaying the web page (a web browser) without proceeding to the payment procedure. Then, the purchase list containing the product is left as it is. The purchase list containing a product and left as it is causes the store to miss a sales chance or causes the user to forget the contents of his purchase list and then add and duplicate the same product on his purchase list. Thus, in this embodiment, another start condition for starting the display of the pop-up image 700 is provided.

In other words, the other predetermined start condition is that "the user makes a request to display the web page of the shopping mall while his purchase list has one or more products already registered."

When the shopping mall site is accessed again after the shopping mall web page display was ended or the web browser was closed with the purchase list having one or more products already registered, the controller 506 automatically displays the pop-up image 700 presenting the purchase list even if the cursor 650 is not moved onto the cart icon 601.

When the user accesses the shopping mall site again after tentatively closing the web browser, the pop-up image 700 is automatically displayed unless the purchase list is empty. The controller 506 deletes the pop-up image 700 if the cursor 650 is not moved onto the cart icon 601 or pop-up image 700 within the above-mentioned predetermined holding time since the first instruction to move the cursor 650 is given after the display of the pop-up image 700 started.

On the other hand, the controller 506 continues to display the pop-up image 700 if the cursor 650 is moved onto the cart icon 601 or pop-up image 700 within the given holding time since the first instruction to move the cursor 650 is given after the display of the pop-up image 700 started.

Incidentally, if there is absolutely no instruction to move the cursor 650 after the display of the pop-up image 700 started, the controller 506 continues to display pop-up image 700.

It is possible that the controller 506 continues to display the pop-up image 700 while the cursor 650 is on the cart icon 601 or pop-up image 700, and ends the display of the pop-up image 700 when the cursor 650 moves out from the cart icon 601 or pop-up image 700.

In other words, an additional end condition that "after the pop-up image 700 is displayed, the cursor 650 enters the display region of the pop-up image 700 and then leaves the display region of the pop-up image 700" can be used. In such a case, the pop-up image 700 disappears immediately after the cursor 650 leaves the display region of the pop-up image 700.

Alternatively, an additional end condition that "after the pop-up image 700 is displayed, the cursor 650 enters the display region of the pop-up image 700 and then leaves the display region of the pop-up image 700, and a given time elapses" can be used. In such a case, the pop-up image 700 does not disappear immediately after the cursor 650 leaves the display region of the pop-up image 700. The pop-up image 700 disappears a given time later after the cursor 650 leaves the display region of the pop-up image 700. The given time can be determined on an arbitrary basis.

Alternatively, the given end condition can be that "the cursor 650 moves neither onto the cart icon 601 nor onto the pop-up image 700 within a given holding time since the first instruction to move the position of the cursor 650 is given after the display of the pop-up image 700 started." In such a case, the pop-up image 700 disappears if the user moves the cursor 650 neither onto the cart icon 601 nor onto the pop-up image 700 after the pop-up image 700 is automatically displayed.

The store terminals 20 installed in the stores have the same hardware configuration as the browsing terminals 30 and therefore its detailed explanation is omitted.

Figure 8:
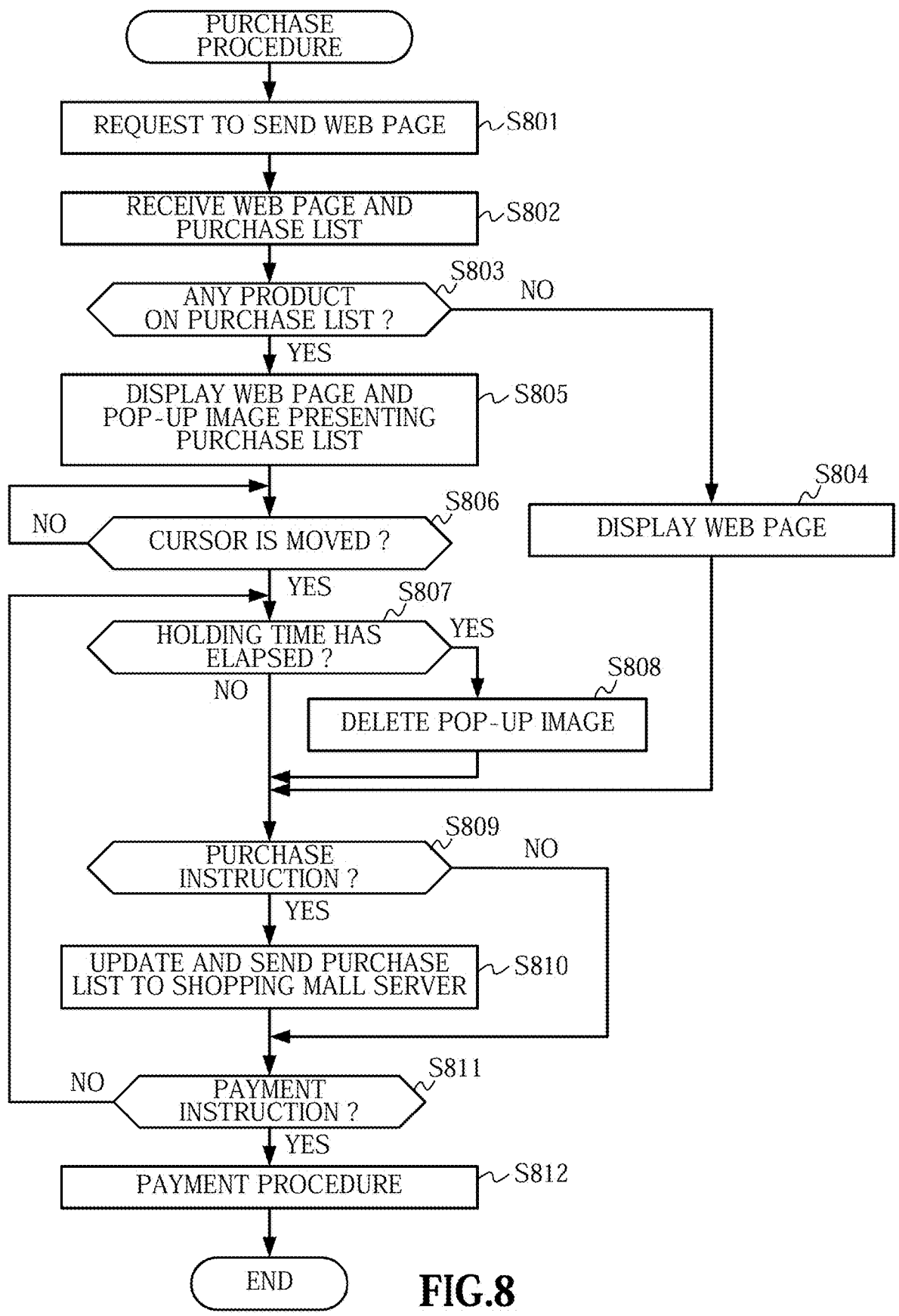
FIG. 8 is a flowchart for explaining the purchase procedure executed by the browsing device.

The purchase procedure executed by the browsing terminals 30 will be described hereafter using the flowchart of FIG. 8. In the purchase procedure, the browsing terminal 30 receives an order for a product from the user and sends order details to the shopping mall server 10. The shopping mall server 10 processes the payment and notifies the store terminal 20 of the order.

First, the controller 506 of the browsing terminal 30 requests the shopping mall server 10 to send a web page (open information) (Step S801). For example, the user operates the browsing terminal 30 to start a web browser and access the top page of the shopping mall. The web browser makes a request to acquire the web page for the shopping mall server 10.

The browsing terminal 30 receives input of a user ID and password from the user, and sends the user ID and password to the shopping mall server 10. The controller 203 of the shopping mall server 10 determines whether the received user ID and password match the user ID and password stored in the storage 201 in advance. If they match, the controller 203 of the shopping mall server 10 notifies the browsing terminal 30 that the user authentication was successful, and allows the user to do shopping. If they do not match, the controller 203 of the shopping mall server 10 notifies the browsing terminal 30 that the user authentication was unsuccessful, and does not allow the user to do shopping. This series of processing is called a log-in procedure.

The controller 203 of the shopping mall server 10 sends data constituting the web page to the browsing terminal 30 that made the request. Furthermore, the controller 203 sends the purchase list to the browsing terminal 30 when the user authentication was successful and the purchase list (notice information) associated with the user has products already registered.

The controller 506 receives the data constituting the web page from the shopping mall server 10 and further receives the purchase list from the shopping mall server 10 when the purchase list of the user has products already registered (Step S802).

The controller 506 determines whether the purchase list of the accessing user has products registered (Step S803). If the purchase list has no product registered (Step S803; NO), the controller 506 displays the web page on the display 551 (Step S804). In other words, when the shopping basket of the user is empty at the time of the user logging in, the web page introducing the products of the shopping mall is displayed but the pop-up image 700 is not displayed.

On the other hand, if the purchase list has products already registered (Step S803; YES), the controller 506 determines that the above-described start condition is satisfied and displays the web page on the display 551 and displays the pop-up image 700 presenting the purchase list on the display 551 (Step S805). In other words, when the purchase list has products already registered at the time of the user logging in, the purchase list is displayed as pop-up even if the user does not move the cursor 650 onto the cart icon 601 or pop-up image 700.

For example, in the event that the user accessed the shopping mall site in the past, closed the web browser with the purchase list containing some products or moved to another site without completing a payment procedure after registering some products on the purchase list, and accesses the shopping mall site again, the purchase list has some products already registered at the time of logging in. Then, when the browsing terminal 30 accesses the shopping mall site, the browsing terminal 30 displays the pop-up image 700 on the top page in a superimposed manner.

After starting the display of the pop-up image 700 in the Step S805, the controller 506 determines whether an instruction to move the cursor 650 is given (Step S806). In other words, it is determined whether the first instruction to move the cursor 650 is given after the pop-up image 700 is displayed.

If no instruction to move the cursor 650 is given after the display of the pop-up image 700 started (Step S806; NO), the controller 506 continues to display the pop-up image 700.

On the other hand, if an instruction to move the cursor 650 is given after the display of the pop-up image 700 started (Step S806; YES), the controller 506 starts measuring the above-described holding time. Then, the controller 506 determines whether the predetermined holding time has elapsed since the first instruction to move the cursor 650 is given (Step S807).

If the predetermined holding time has elapsed without the cursor 650 moving onto the cart icon 601 or pop-up image 700 since the first instruction to move the cursor 650 is given after the display of the pop-up image 700 started (Step S807; YES), the controller 506 determines that the above-described end condition is satisfied and deletes the pop-up image 700 (Step S808).

In other words, in the event that the browser is closed tentatively with the shopping basket containing some products and the shopping mall site is accessed again, the pop-up image 700 is displayed even if the cursor 650 is not moved onto the cart icon 601 or pop-up image 700. However, the pop-up image 700 automatically disappears if the cursor 650 is not moved onto the cart icon 601 or pop-up image 700 within a given holding time since the user started moving the cursor 650 after the pop-up image 700 was displayed.

If the given holding time has not elapsed since the user started moving the cursor 650 after the display of the pop-up image 700 started (Step S807; NO), the controller 506 determines that the end condition is not satisfied and continues to display the pop-up image 700.

Incidentally, in the event that the given holding time has elapsed since the user started moving the cursor 650 after the display of the pop-up image 700 started and that the user has moved the cursor 650 onto the cart icon 601 or pop-up image 700 before the given holding time has elapsed, the controller 506 determines that the end condition is not satisfied and continues to display the pop-up image 700. This is because presumably, the user has interest in the contents of his purchase list contained in the pop-up image 700.

The controller 506 determines whether the user enters an instruction to add a product to his purchase list (purchase instruction) (Step S809). Regardless of the pop-up image 700 being displayed or not, the user can add to his purchase list a new product sold at the shopping mall or change the contents of his purchase list.

If no purchase instruction is entered (Step S809; NO), the controller 506 proceeds to Step S811. If a purchase instruction is entered (Step S809; YES), the controller 506 updates the purchase list according to the purchase instruction and sends the user ID and purchase list to the shopping mall server 10 (Step S810). The controller 203 of the shopping mall server 10 receives the user ID and purchase list from the browsing terminal 30 and updates the purchase list database 252.

The controller 506 determines whether the user enters an instruction to make a payment for the products registered on the purchase list (payment instruction) (Step S811). The user can enter a payment instruction by pressing the payment buttons 701 contained in the pop-up image 700.

If no payment instruction is entered (Step S811; NO), the controller 506 repeats the processing of the Steps S807 to S811.

Incidentally, if the user closes the web browser or moves to another site without any payment instruction, the purchase procedure is forced to end. However, the latest purchase list is sent and stored in the shopping mall server 10 in the Step S810. Therefore, next time the user accesses the shopping mall site using the browsing terminal 30, the browsing terminal 30 receives the purchase list on which unpaid products are registered in the Step S802 and displays the purchase list as pop-up in the Step S805.

If the payment instruction is entered (Step S811; YES), the controller 506 executes a procedure to make a payment for the products registered on the purchase list (payment procedure) (Step S812). More specifically, the controller 506 of the browsing terminal 30 receives input of a credit card number or the like from the user, sends the credit card number to the shopping mall server 10, and requests the shopping mall server 10 to process a payment. The controller 203 of the shopping mall server 10 requests the payment server (not shown) of the credit company to process the payment using the received credit card number. After completing the payment normally, the payment server notifies the shopping mall server 10 so. The controller 203 of the shopping mall server 10 notifies the browsing terminal 30 that the payment is completed normally. The controller 203 of the shopping mall server 10 notifies the store terminal 20 of the store selling the product that the order of the product is finalized. The store terminal 20 notifies a person in charge of the store of the order details and the person in charge ships the product to the user.

Incidentally, it is possible that the credit card number is transmitted/received at the first use with the shopping mall and the shopping mall server 10 stores the credit card number in the storage 201 for use for the second and subsequent times. Furthermore, the payment method is not limited to payment by a credit card. The payment can be made by a debit card, e-money, bank transfer, or cash on delivery.

In this embodiment, the browsing terminal 30 can notify the user of the contents of his purchase list in an easy-to-understand manner so as to motivate and encourage the purchase. Furthermore, the user can easily acknowledge the contents of his own purchase list, whereby preventing him from adding and duplicating the same product on his purchase list. Particularly, in the event that a product is added to the purchase list and the web browser is closed tentatively and then the shopping mall is accessed again, the contents of the purchase list are automatically displayed as pop-up. The user will know that his purchase list is not empty and be encouraged to purchase the products. On the other hand, if the user does not show any interest within the predetermined holding time after the pop-up image 700 is displayed, the pop-up image 700 automatically disappears. Thus, the user is reminded but not annoyed too much.

(Embodiment 2)

Embodiment 2 will be described hereafter. Many stores exhibit their products at a shopping mall and many advertisements are posted on the web page. Advertisements are a useful means for giving the users motivation to purchase the products. If an advertisement is hidden by the pop-up image 700, the advertising effect of the advertisement is impaired. Then, this embodiment is provided with a measure to prevent the pop-up image 700 from hiding advertisements as much as possible.

For example, when a web page is displayed as shown in FIG. 6 and the pop-up image 700 is displayed as shown in FIG. 7, among the ad images 602A, 602B, and 602C, the ad image 602A is partly hidden and the ad images 602B and 602C are entirely hidden. Then, even though the pop-up image 700 disappears in the predetermined holding time, the appeal of the ad images 602A, 602B, and 602C to the user is diminished.

Then, in this embodiment, the controller 506 of the browsing terminal 30 enlarges the pop-up image 700 and sets the portion overlapping with the ad images 602A, 602B, and 602C as a transparent or translucent margin so as to prevent the advertisements from being hidden from view.

HTML data constituting a web page include description of the display positions and sizes of the ad images 602A, 602B, and 602C. The controller 506 can acknowledge where the ad images 602A, 602B, and 602C are positioned and which region does not overlap with the ad images 602A, 602B, and 602C.

Figure 9:
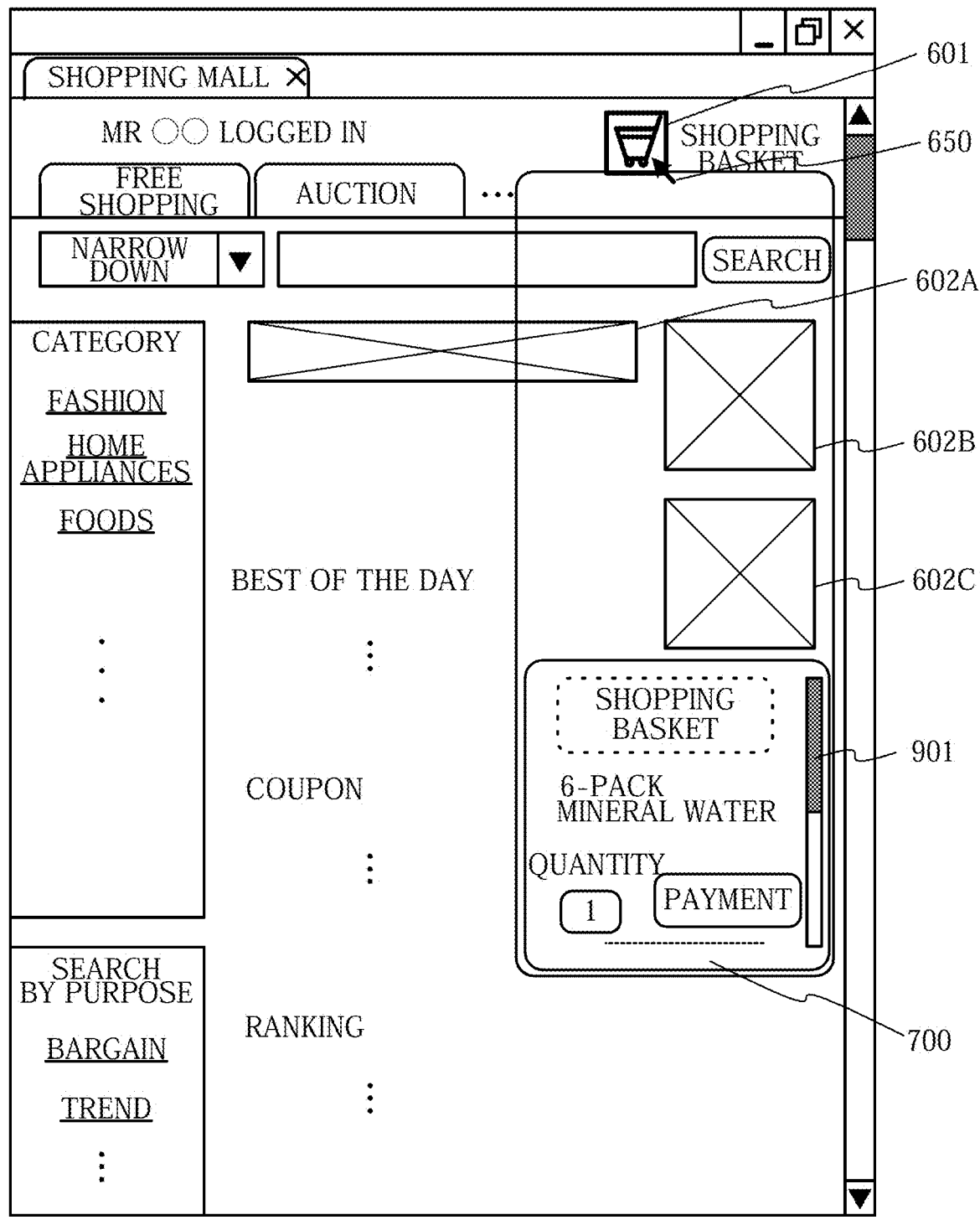
FIG. 9 is an illustration showing an exemplary structure of a pop-up image presenting a purchase list.

FIG. 9 shows an exemplary display of the pop-up image 700. The pop-up image 700 is extended downward from the cart icon 601 for displaying the purchase list and displayed so that the following conditions are all satisfied.

(Condition 1) No characters or images presenting the purchase list are placed in the portion of the pop-up image 700 that overlaps with the display regions of the ad images 602A, 602B, and 602C.

(Condition 2) The portion of the pop-up image 700 that overlaps with the display regions of the ad images 602A, 602B, and 602C is transparent or translucent so that the ad images 602A, 602B, and 602C can be seen through it.

The controller 506 changes the color, size, and shape of the pop-up image 700 and the contents displayed by the pop-up image 700 so that the above conditions are all satisfied.

The controller 506 can set only the portion overlapping with the display regions of the ad images 602A, 602B, and 602C transparent or translucent and set the non-overlapping portion opaque.

It is recommended that the controller 506 displays the contour of the pop-up image 700 so that the user can easily recognize the display region of the pop-up image 700 even if the contour overlaps with the display regions of the ad images 602A, 602B, and 602C.

As the pop-up image 700 becomes larger, the web page may be hidden and the entire page may become difficult to view. Then, the controller 506 may set the font sizes of character strings used in the pop-up image 700 relatively smaller than usual to make the pop-up image 700 smaller.

Furthermore, in order for the pop-up image 700 not to be excessively large in consideration of the overall balance in the web page, the controller 506 may place a scroll bar 901 in the pop-up image 700 so that the purchase list can be scrolled to browse. Particularly, it is recommended to place the scroll bar 901 in the pop-up image 700 when many products are registered on the purchase list.

Unlike FIG. 7, there are no product images in the pop-up image 700 in FIG. 9. The controller 506 can place product images in the pop-up image 700. The controller 506 can set the product images relatively smaller than usual to make the pop-up image 700 smaller when the controller 506 assumes that the pop-up image 700 will become larger than a given size.

As a transparent or translucent region is clicked and the ad image 602A, 602B, or 602C is displayed on the clicked region in a superimposed manner, the controller 506 makes a shift to a screen associated with the ad image 602A, 602B, or 602C in advance.

The event of clicking within a transparent or translucent region is once acquired by the pop-up image 700 but transferred to the window below the pop-up image 700 (the web page) as it is.

When the events such as cursor move to the pop-up image 700, cursor move from the pop-up image 700, and clicking within the pop-up image 700 occur, first, an event handler assigned to the pop-up image 700 is executed by the controller 506. The event of clicking on a product image 700 within the pop-up image 700 is processed as it is, and the event of clicking within the transparent or translucent region is transferred to the underlying window.

Incidentally, when the cursor 650 enters the transparent or translucent region of the pop-up image 700, the controller 506 assumes that the cursor 560 moves onto the pop-up image 700.

In this embodiment, the browsing terminal 30 can notify the user of the contents of his purchase list in an easy-to-understand manner without hiding the advertisements so as to motivate and encourage the purchase.

(Embodiment 3)

Embodiment 3 will be described hereafter. This embodiment is also provided with a measure to prevent the pop-up image 700 from hiding advertisements as much as possible.

Figure 10:
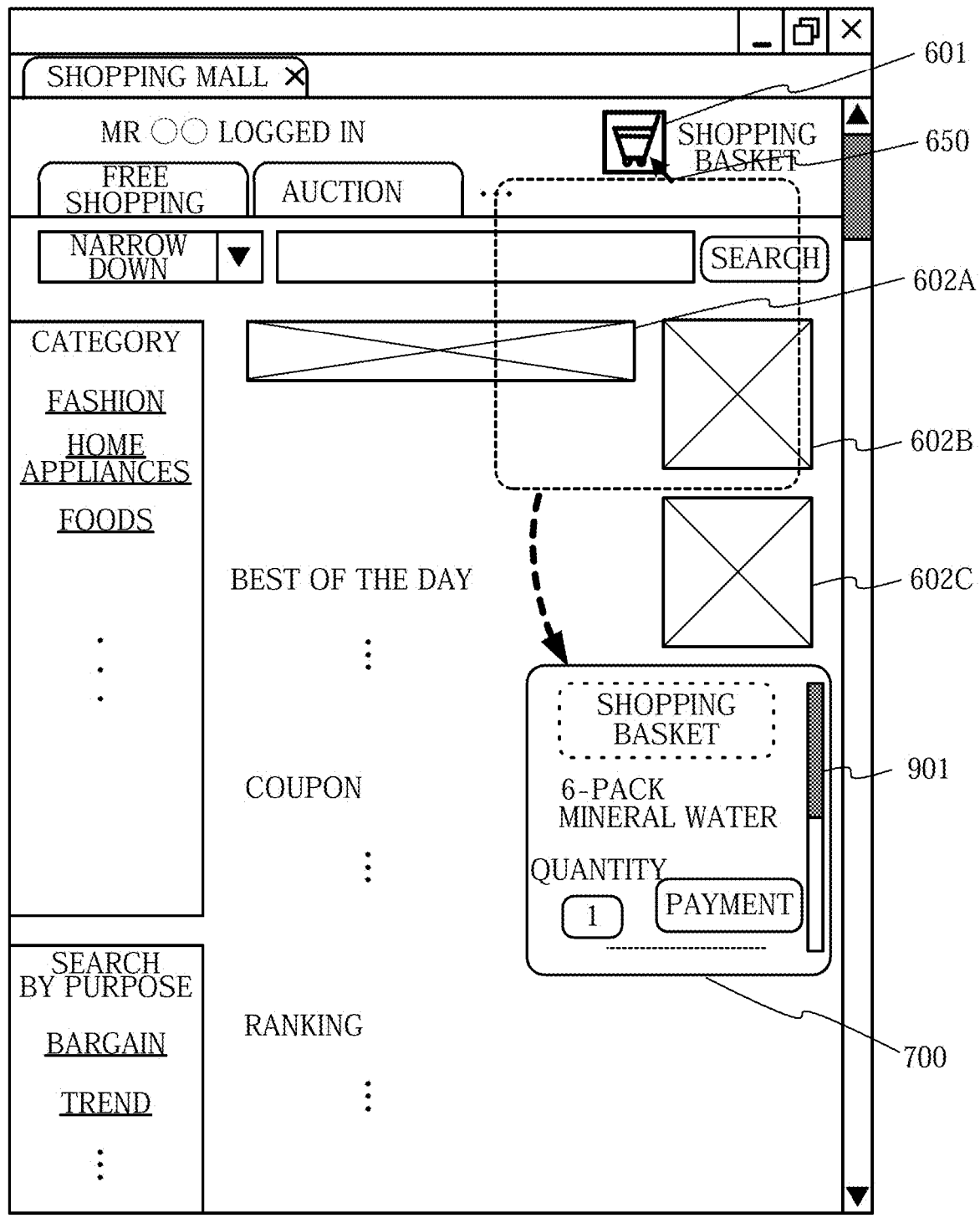
FIG. 10 is an illustration showing an exemplary structure of a pop-up image presenting a purchase list.

FIG. 10 shows an exemplary display of the pop-up image 700. In FIGS. 7 and 9, the controller 506 extends the pop-up image 700 downward from the cart icon 601 for displaying the purchase list. In FIG. 10, the controller 506 moves the pop-up image 700 to a position where the pop-up image 700 does not overlap with the ad images 602A, 602B, and 602C regardless of the position of the cart icon 601.

The controller 506 can display the pop-up image 700 at a position whether the pop-up image 700 does not overlap with the ad images 602A, 602B, and 602C from the beginning. However, if the pop-up image 700 is mostly away from the cart icon 601, the user may have difficulty in acknowledging where the pop-up image 700 is displayed. Then, the controller 506 can set the initial position of the pop-up image 700 near the cart icon 601 as shown in FIG. 7 and then move the pop-up image 700 gradually to a position whether the pop-up image 700 does not overlap with the ad images 602A, 602B, and 602C. In this way, the user can follow the move of the pop-up image 700 with his eyes and easily recognize the display position of the pop-up image 700. The pop-up image 700 can be moved at any speed.

It is also possible that the controller 203 of the shopping mall server 10 determines the display position of the pop-up image 700 and notifies the browsing terminal 30 of the display position, whereby the browsing terminal 30 displays accordingly. However, it is preferable that the controller 506 of the browsing terminal 30 determines the display position of the pop-up image 700 in each case because how a web page is displayed highly depends on the performance of the browsing terminal 30, the resolution of the display 551, the browser settings, the character font type and size to be used, and the like.

The controller 506 can draw attention of the user not only by display but also by sound such as a given sound effect reproduced while the pop-up image 700 is moving.

In the course of the pop-up image 700 moving, the controller 506 can set the pop-up image 700 partly or entirely transparent or translucent when the pop-up image 700 passes through the regions overlapping with the ad images 602A, 602B, and 602C, whereby the ad images 602A, 602B, and 602C are not entirely invisible, and set the pop-up image 700 opaque when the pop-up image 700 does not overlap with the ad images 602A, 602B, and 602C.

With this embodiment, the browsing terminal 30 can notify the user of the contents of his purchase list in an easy-to-understand manner without hiding the advertisements as much as possible so as to motivate and encourage the purchase.

The present disclosure is not confined to the above-described embodiments and various modifications and applications are available. Furthermore, the components of the above described embodiments can be combined on an arbitrary basis.

The present disclosure can provide a browsing device, information processing system, browsing device control method, recording medium, and program for properly giving notice accompanying information the user requests to browse, thereby, for example, motivating and encouraging the user to purchase a product.

| Reference Signs List | |
|---|---|
| 10 | Shopping mall server |
| 20, 20A, 20B, 20C | Store terminal |
| 30, 30A, 30B | Browsing terminal |
| 50 | Communication network |
| 201 | Storage |
| 202 | Communicator |
| 203 | Controller |
| 251 | Product database |
| 252 | Purchase list database |
| 501 | Communicator |
| 502 | Image processor |
| 503 | Sound processor |
| 504 | I/O |
| 505 | Storage |
| 506 | Controller |
| 551 | Display |
| 552 | Speaker |
| 601 | Cart icon |
| 602, 602A, 602B, 602C | Ad image |
| 650 | Cursor |
| 700 | Pop-up image |
| 701, 701A, 701B | Payment button |
| 702, 702A, 702B | Change button |

The invention claimed is:

1. A browsing device, comprising:
    at least one non-transitory memory operable to store computer program code; and
    at least one processor operable to read said computer program code and operate as instructed by said computer program code, said computer program code comprising:
        acquirer code configured to cause at least one of said at least one processor to acquire:
            open information that is requested to be browsed by a user; and
            notice information accompanying the open information, wherein the notice information is notified to the user; and
        display code configured to cause at least one of said at least one processor to:
            based on the open information and the notice information being acquired, display the open information in a display region of a browser, along with the notice information within a notice region that is a portion of the display region, wherein the notice region overlays the displayed open information;
            detect that a cursor is moved while the open information and the notice information are displayed;

based on the cursor being detected to be moved while the open information and the notice information are displayed, start a countdown of a pre-set duration of time until completion;

based on the countdown of the pre-set duration of time being completed, determine that the moved cursor is not moved within the notice region, during the completed countdown of the pre-set duration of time; and based on the moved cursor being determined to not be moved within the notice region, during the completed countdown of the pre-set duration of time, end display of the notice information, wherein the open information contains advertisement images, and wherein the display code is further configured to cause at least one of said at least one processor to, based on the open information and the notice information being displayed, gradually move the notice region in which the notice information is displayed, from a first position at which the notice region overlaps with the advertisement images in the displayed open information to a second position at which the notice region does not overlap with the advertisement images.

2. The browsing device according to claim 1, wherein the open information includes products sold in an online shopping mall, and wherein the notice information includes a purchase list containing at least one of the products that the user intends to purchase.

3. A browsing device, comprising:

at least one non-transitory memory operable to store computer program code; and at least one processor operable to read said computer program code and operate as instructed by said computer program code, said computer program code comprising:

acquirer code configured to cause at least one of said at least one processor to acquire:

open information that is requested to be browsed by a user; and notice information accompanying the open information, wherein the notice information is notified to the user; and display code configured to cause at least one of said at least one processor to:

based on the open information and the notice information being acquired, display the open information in a display region of a browser, along with the notice information within a notice region that is portion of the display region, wherein the notice region overlays the displayed open information;

detect that a cursor is moved while the open information and the notice information are displayed;

based on the cursor being detected to be moved while the open information and the notice information are displayed, start a countdown of a pre-set duration of time until completion;

based on the countdown of the pre-set duration of time being completed, determine that the moved cursor is not moved within the notice region, during the completed countdown of the pre-set duration of time; and based on the moved cursor being determined to not be moved within the notice region, during the completed countdown of the pre-set duration of time, end display of the notice information, wherein the open information contains advertisement images, and wherein the display code is further configured to cause at least one of the at least one processor to, based on the open information and the notice information being acquired:

determine that the notice region within which the notice information is to be displayed overlaps with the advertisement images in the open information to be displayed; and based on the notice region within which the notice information is to be displayed being determined to overlap with the advertisement images in the open information to be displayed:

extend, downward from a position at which the notice region overlaps with the advertisement images, the notice region within which the notice information is to be displayed;

set a first region of the extended notice region to be transparent or translucent, wherein the first region overlaps with the advertisement images;

display the notice information in a second region of the extended notice region, wherein the second region does not overlap with the advertisement images; and display a contour of the extended notice region regardless of whether the contour overlaps with the advertisement images.

4. The browsing device according to claim 2, wherein the displayed notice information includes at least one payment button for receiving a request from the user to make a payment for the at least one of the products contained in the purchase list, and wherein the computer program code further comprises:

input receiver code configured to cause at least one of said at least one processor to receive the request that is made by pressing the at least one payment button; and payment instructor code configured to cause at least one of said at least one processor to, based on the request being received, instruct at least one server, via a communication network, to process the payment for the at least one of the products.

5. An information processing system, comprising:

a browsing device that is used by a user; and a server connected to the browsing device, via a communication network, wherein the server comprises:

a storage storing open information and notice information accompanying the open information; and a transmitter transmitting the open information and the notice information, to the browsing device, wherein the browsing device comprises:

at least one memory configured to store computer program code; and at least one processor configured to access said at least one memory and operate as instructed by said computer program code, said computer program code comprising:

acquirer code configured to cause at least one of said at least one processor to acquire:

the open information that is requested to be browsed by the user; and the notice information from the server, wherein the notice information is notified to the user; and display code configured to cause at least one of said at least one processor to:
- based on the open information and the notice information being acquired, display the open information in a display region of a browser, along with the notice information within a notice region that is a portion of the display region, wherein the notice region overlays the displayed open information;
- detect that a cursor is moved while the open information and the notice information are displayed;
- based on the cursor being detected to be moved while the open information and the notice information are displayed, start a countdown of a pre-set duration of time until completion;
- based on the countdown of the pre-set duration of time being completed, determine that the moved cursor is not moved within the notice region, during the completed countdown of the pre-set duration of time; and
- based on the moved cursor being determined to not be moved within the notice region, during the completed countdown of the pre-set duration of time, end display of the notice information, wherein the open information contains advertisement images, and wherein the display code is further configured to cause at least one of said at least one processor to, based on the open information and the notice information being displayed, gradually move the notice region in which the notice information is displayed, from a first position at which the notice region overlaps with the advertisement images in the displayed open information to a second position at which the notice region does not overlap with the advertisement images.

6. A browsing device control method, comprising:
- acquiring open information that is requested to be browsed by a user, and notice information accompanying the open information, wherein the notice information is notified to the user;
- based on the open information and the notice information being acquired, displaying the open information in a display region of a browser, along with the notice information within a notice region that is a portion of the display region, wherein the notice region overlays the displayed open information;
- detect that a cursor is moved while the open information and the notice information are displayed;
- based on the cursor being detected to be moved while the open information and the notice information are displayed, starting a countdown of a pre-set duration of time until completion;
- based on the countdown of the pre-set duration of time being completed, determine that the moved cursor is not moved within the notice region, during the completed countdown of the pre-set duration of time; and
- based on the moved cursor position being determined to not be moved within the notice region, during the completed countdown of the pre-set duration of time, ending display of the notice information, wherein the open information contains advertisement images, and wherein the browsing device control method further comprises, based on the open information and the notice information being displayed, gradually moving the notice region in which the notice information is displayed, from a first position at which the notice region overlaps with the advertisement images in the displayed open information to a second position at which the notice region does not overlap with the advertisement images.

7. A computer-readable non-transitory recording medium on which a program is recorded, the program allowing a computer to:
- acquire open information that is requested to be browsed by a user, and notice information accompanying the open information, wherein the notice information is notified to the user;
- based on the open information and the notice information being acquired, display the open information in a display region of a browser, along with the notice information within a notice region that is a portion of the display region, wherein the notice region overlays the displayed open information;
- detect that a cursor is moved while the open information and the notice information are displayed;
- based on the cursor being detected to be moved while the open information and the notice information are displayed, start a countdown of a pre-set duration of time until completion;
- based on the countdown of the pre-set duration of time being completed, determine that the moved cursor position is not moved within the notice region, during the completed countdown of the pre-set duration of time; and
- based on the moved cursor position being determined to not be moved within the notice region, during the completed countdown of the pre-set duration of time, end display of the notice information, wherein the open information contains advertisement images, and wherein the program further allows the computer to, based on the open information and the notice information being displayed, gradually move the notice region in which the notice information is displayed, from a first position at which the notice region overlaps with the advertisement images in the displayed open information to a second position at which the notice region does not overlap with the advertisement inmates.

* * * * *